United States Patent [19]

Suzuki et al.

[11] Patent Number: 4,538,191
[45] Date of Patent: Aug. 27, 1985

[54] MAGNETIC CARD READER

[75] Inventors: Akihiro Suzuki, Okazaki; Keiichi Souda; Masao Kuno, both of Kariya; Hiroshi Ikuta, Okazaki, all of Japan

[73] Assignee: Nippondenso Co., Ltd., Kariya, Japan

[21] Appl. No.: 395,982

[22] Filed: Jul. 7, 1982

[30] Foreign Application Priority Data

Jul. 8, 1981 [JP] Japan .................................. 56-107294

[51] Int. Cl.³ .............................................. G11B 17/00
[52] U.S. Cl. ........................................ 360/88; 360/104
[58] Field of Search .................................. 360/88, 104

[56] References Cited

FOREIGN PATENT DOCUMENTS 2741473  3/1979  Fed. Rep. of Germany ...... 360/104
56-55789 12/1981  Japan .
526006  9/1976  U.S.S.R. ................................ 360/104

Primary Examiner—A. J. Heinz
Attorney, Agent, or Firm—Cushman, Darby & Cushman

[57] ABSTRACT

A magnetic card reader comprises guide members providing a card path for guiding a magnetic card. In order that a magnetic head is provided with an elasticity and the reading surface of the magnetic head follows the distortion or inclination of the card, the magnetic head is made rotatable by being held by a pair of elastic members and a pair of support members for journaling the ends of the elastic members.

19 Claims, 11 Drawing Figures

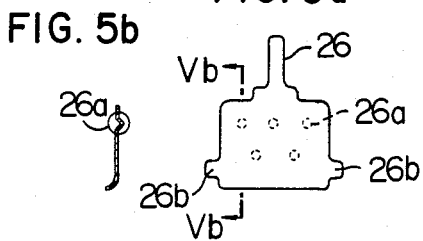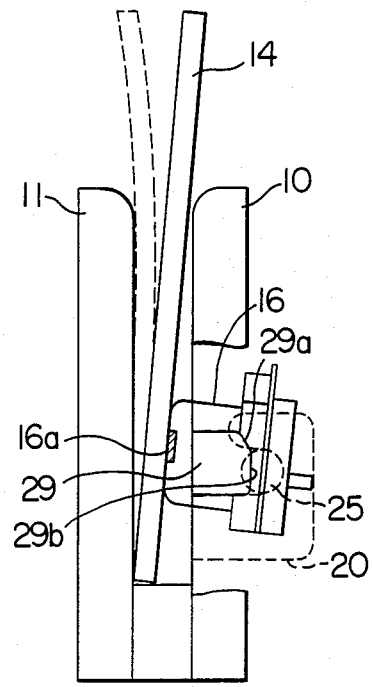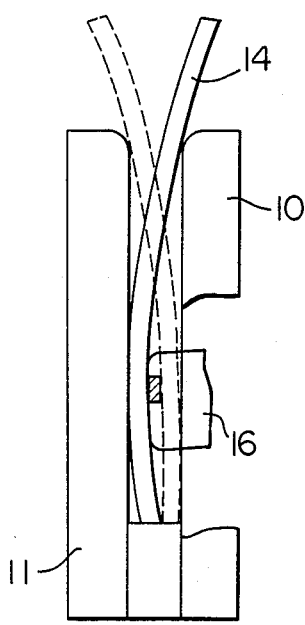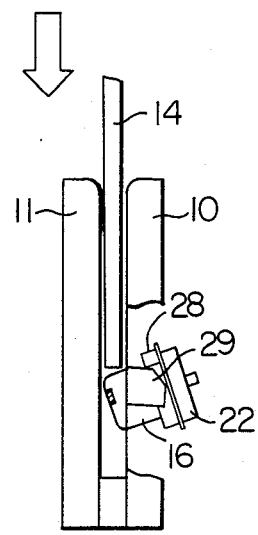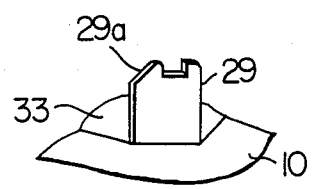

MAGNETIC CARD READER

BACKGROUND OF THE INVENTION

The present invention relates to a magnetic card reader having an improved reading accuracy and a simplified construction.

A magnetic card reader has a card path for guiding a card. The space of the card path generally has a considerable margin of thickness as compared with the card thickness for smoothing the movement of the card therethrough. In the space of the path, the magnetic head is required to come into accurately close contact with the recording surface of the magnetic card.

In order to secure such a close contact, the conventional card readers are so constructed that a roller made of an elastic material is arranged facing the path thereby to press the card against the magnetic head. This construction results in an increased number of parts for supporting the roller including the roller on the one hand and the parts being required to be mounted on both sides of the card on the other hand.

SUMMARY OF THE INVENTION

In view of the above-mentioned disadvantages of the conventional card readers, the primary object of the present invention is to provide a magnetic card reader which secures a close contact of the magnetic head without using a roller.

According to the present invention, there is provided a magnetic card reader comprising a pair of guide members forming a card path so constructed that the magnetic head has an elasticity and is rotatable for causing the reading surface thereof to follow the distortion or inclination of the card, and the magnetic head is supported by two elastic members and two supporting members for journaling the ends thereof.

According to another aspect of the present invention, in order to fix the offset position of the magnetic head and provide the elastic members with an initial load, positioning members separate from the supporting members are provided.

According to a preferred embodiment of the present invention, there is provided a magnetic card reader which has an extremely improved mounting workability on the one hand and requires no special adjusting points on the other hand.

According to still another aspect of the present invention, there is provided a magnetic card reader comprising a reading section having a very high contacting ability and a simple construction for accurate operation.

BRIEF DESCRIPTION OF THE DRAWINGS

FIGS. 1 to 8 show an embodiment of the present invention, in which:

FIG. 1 is a perspective view of the embodiment;
FIG. 2 is a partially-cutaway front view thereof;
FIG. 3 is a front view of a movable assembly 18;
FIG. 4 is a bottom view thereof;
FIG. 5a is a front view of a metal plate 26;
FIG. 5b is a sectional view taken along the line Vb-Vb in FIG. 5a;
FIG. 5c is a bottom view of the metal plate thereof;
FIGS. 6 and 7 are diagrams for explaining the rotation of the magnetic head according to the manner in which the card is inserted;
FIG. 8 is a diagram for explaining the stopper action against the card inserted erroneously; and
FIG. 9 is a perspective view showing a modification of the positioning members 29.

DESCRIPTION OF PREFERRED EMBODIMENT

Figure 1:
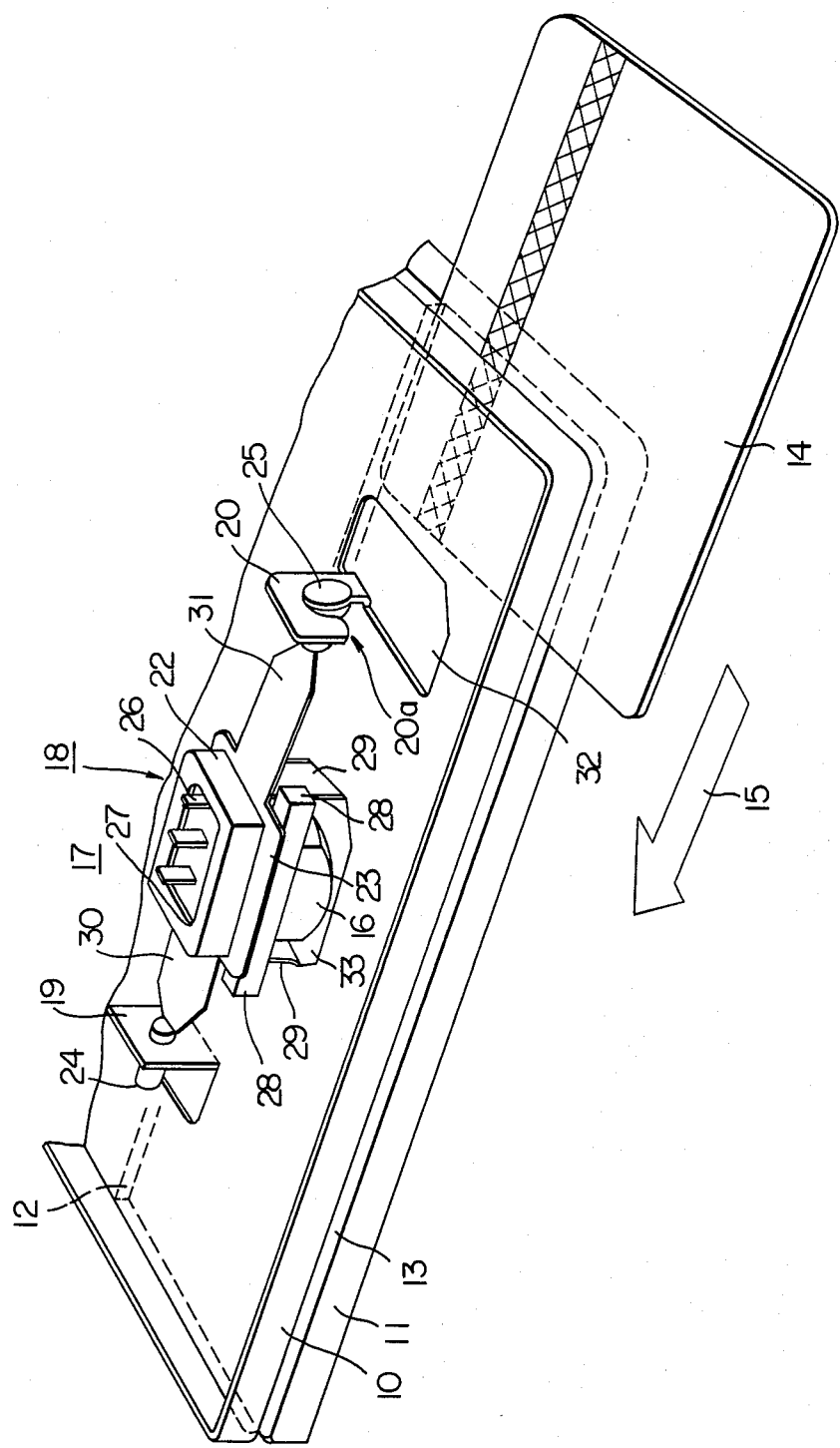
Figure 2:
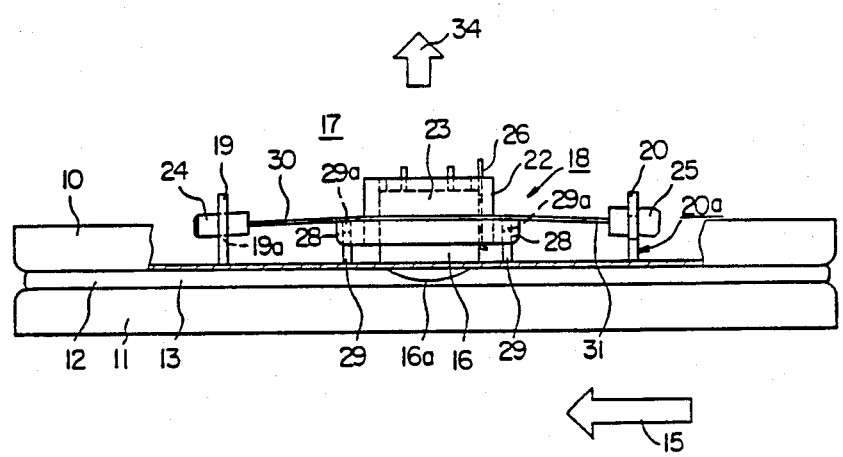

In FIGS. 1 and 2 showing an embodiment of the present invention, reference numerals 10 and 11 designate guide members formed by pressing a metal plate, which guide members 10 and 11 are securely screwed (not shown) through the intermediary of a metal plate 12 of predetermined thickness thereby to form a card path 13 allowing the passage of a magnetic card 14. The card path 13 has a space of the thickness about twice of the card 14 thereby to permit the magnetic card 14 to move smoothly in the direction of arrow 15 in contact with an end of the metal plate 12.

A holder 17 for holding a magnetic head 16 is constructed in the guide member 10. The holder 17 includes a movable assembly 18 integrally constructed with the magnetic head 16 and a pair of support members 19 and 20 cut up from the guide member 10.

Figure 3:
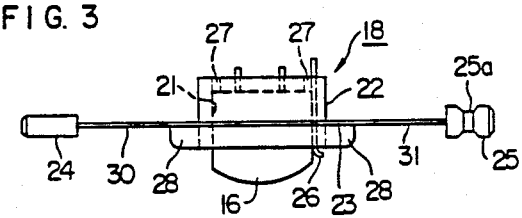
Figure 4:
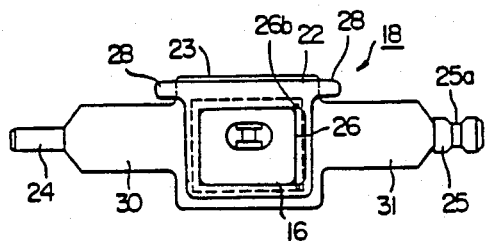

The movable assembly 18, as shown in detail in FIGS. 3 and 4, comprises the essential parts of a holding frame 22 of resin (such as ABS resin) provided in the hollow portion 21 for holding the magnetic head 16 pressed therein, a spring plate 23 of metal (such as stainless steel spring material, phosphor bronze spring material or beryllium copper spring material) extending laterally from the holding frame 22 and first and second bar-shaped members 24 and 25 of resin (such as ABS resin) of circular section mounted on each end of the spring plate, which are produced by insert molding.

Specifically, the holding frame 22 holds a metal plate 26 integral with the magnetic head 16 in a state that the integral thing is pressed into the holding frame in the direction of an arrow 35 (FIG. 3). In the process, the holding frame 22 and the magnetic head 16 may be secured to each other by a bonding agent. Nevertheless, from the viewpoint of a simple workability, it is more desirable to integrally form a protrusion on the inside of the holding frame 22 thereby to hold the magnetic head 16 and the metal plate 26 by pressing them inward when they are pressed in. The holding frame has a step 27 for determining the position of pressing in the magnetic head 16.

The metal plate 26, as shown in FIGS. 5a, 5b and 5c, has several protrusions 26a formed by press work thereon thereby to maintain a good electrical contact with the outer plate of the magnetic head 16. FIG. 5a shows a front view of the metal plate 26, and FIGS. 5b and 5c show a sectional view and bottom view of the metal plate 26 respectively. The terminal of the metal plate 26 together with the terminals of the magnetic head 16 are protruded through the opening of the holding frame 22 and is connected through a lead wire (not shown) to an electrical circuit section. The metal plate 26 is used, for instance, for effectively grounding the outer plate of the magnetic head 16. In advance of pressing the magnetic head 16 into the holding frame 22, the lugs 26b of the metal plate 26 are adapted to engage small slots formed on the inside of the holding frame 22, thus simplifying the press-in work.

The strength with which the magnetic head 16 is held may be to such a degree as to allow the press-in work to be performed manually. The holding frame 22 has protrusions 28 extending laterally, which in cooperation with the positioning members 29 described later, act as a stopper against the erroneous insertion of the magnetic card.

The spring plate 23 extends laterally to form elastic members 30 and 31 respectively. An end of the spring plate 23 is integrated with the first cylindrical bar-shaped member 24 by insert molding, while the other end thereof is integrated with the cylindrical drum-like second bar-shaped member 25 having a neck 25a by insert molding. These two bar members share a central axis, around which they are rotatable.

The first support member 19 is cut up vertically from the guide member 10 by press work, so that the first bar-shaped member 24 is fitted in the circular hole 19a thereby to be supported rotatably and slidably. The second support member 20, on the other hand, is cut up vertically from the guide member 10 and has a recess 20a of inverted-J shape thereby to support the neck 25a of the second bar-shaped member 25 rotatably (but not slidably). The recess 20a may be formed as a path slightly narrower than a hole and the neck 25a for pressing the neck 25a into the hole, in order to make supporting of the neck part 25a more secure.

In the guide member 10, the hole 32 left by cutting up the second support member 20 is enlarged on the side of the recess 20a more than the projected area of the support member 20, thus improving the workability for fitting the bar member 25.

The two positioning members 29 are also cut up from the guide member 10 vertically. The hole left by cutting them up is enlarged more than the projected area of the positioning members 29 thereby to form an opening 33 to receive the magnetic head 16.

The positioning members 29, when the movable assembly 18 is mounted, are in contact with the parts of the elastic members 30 and 31 respectively which parts are located near the holding frame 22 thereby to determine the minimum distance between the contact point and the reference surface of the guide member 10, and to determine the offset position of the reading surface 16a of the magnetic head 16. Further, the height of the positioning member 29 is set slightly higher than that of the central axis of the bar-shaped members 24 and 25 supported by the support members 19 and 20 respectively, from the reference surface of the guide member 10. Therefore, when the ends of the elastic members 30 and 31 are fixed on the bar-shaped members 24 and 25, the elastic members 30 and 31 are slightly urged along the arrow 34 in the vicinity of the magnetic head.

The elastic members 30 and 31 are thus provided with an initial load for urging the magnetic head 16 in the direction opposite to the arrow 34 so that the reading surface 16a of the magnetic head is brought into close contact with the magnetic card 14 on the one hand and the magnetic head 16 is prevented from being displaced by vibrations or external pressure on the other hand.

The positioning members 29 have a stop position of the rotation of the movable assembly 18 and also a flat portion 29b parallel to the reference surface of the guide member 10 (FIG. 6) to assure smooth rotation thereof.

Before a mounting step, the movable assembly 18 in which the magnetic head 16 and the metal plate 26 are held by being pressed is prepared. On the other hand, another assembly including the guide member 10 carrying the support members 19 and 20 which are provided as cut-up parts formed by punching in press process and by bending, and the positioning members 29 and the guide member 11 is prepared. First, the first bar-shaped member 24 of the movable assembly 18 is inserted into the hole of the first support member 19, and then the neck part 25a of the second bar member 25 is fitted in the recess 20a of the second support member 20. In the process, the taper 29a formed on the positioning members 29 facilitates the smooth fitting of the elastic members 30 and 31 on the flat portion 29b. In fitting the bar member 25 in the second support member 20, the hole 32 permits smooth movement of the bar member 25 without interferring with the movement thereof.

In this way, when the magnetic head 16 is held, it is protruded in the card path 13 as shown in FIG. 2. The reading surface 16a is kept in position by the positioning members 29.

As shown in FIG. 1, when the magnetic card 14 is moved manually along the card path 13, the magnetic head 16 is pushed up in the direction of an arrow 34 (FIG. 2) by the length equivalent to the thickness of the card 14. As a result, the magnetic head 16 is further urged by the restitution power of the elastic members 30 and 31 into closer contact with the magnetic card 14. The lateral contraction of the elastic members 30 and 31 caused by the upward displacement of the magnetic head 16 takes the form of the first bar member 24 sliding relative with the support member 19.

The magnetic card 14 inserted diagonally and distorted is shown in FIGS. 6 and 7 respectively. As in these cases, unless the surface of the magnetic card 14 in contact with the magnetic head 16 is parallel with the card path, the magnetic head 16 is inclined when lifted by the thickness of the card. Nevertheless, since the movable assembly 18 is rotatably supported and rotates smoothly, the reading surface of the magnetic head 16 is kept in close contact with the magnetic card 14. In spite of these adverse conditions, therefore, the data recorded in the magnetic card can be read accurately.

FIG. 8 shows a case in which the magnetic card 14 is inserted perpendicular to the normal position of insertion and is utterly unreadable. In response to such an insertion, the magnetic head 16 is inclined by the pressure from an end of the magnetic card 14, and the movable assembly 18 rotates. The two protrusions 28 formed on the holding frame 22 of the movable assembly 18 come into contact with the positioning members 29 thereby to prevent the movable assembly 18 from further rotation. In this way, the movable assembly 18 is prevented from rotating to an unrestorable angle while at the same time preventing the electric leads from being subjected to pressure.

An embodiment of the present invention is described above. In addition to the case in which the magnetic card is fed manually, the present invention is applicable also to the case in which the magnetic card is fed automatically by motor or the like.

The bar-shaped members 24 and 25 may have a rectangular instead of circular section to the extent that the outer peripheral portions thereof are supported in contact with the support members 19 and 20 and are rotatable. The bar-shaped members may be made of metal instead of resin.

The guide members 10 and 11 may also be made of resin instead of metal plate. The support members 19 and 20 and the positioning members 29 may also be made of resin.

The positioning members 29 of the shape as shown in FIG. 9 have the same effect as in the aforementioned embodiment.

We claim:

1. A magnetic card reader, comprising:

guide members including an interior card path having space larger than the thickness of a magnetic card for guiding the movement of the magnetic card; and holding means provided in said guide members for holding a transducer to face said path, said transducer reading data recorded on said magnetic card when said magnetic card is moving by it; said holding means including a movable assembly including a holding frame for holding said transducer, a pair of elastic members, with ends, extending in the direction of movement of said magnetic card in a manner to hold said holding frame and a pair of bar-shaped members, with respective outer peripheries adapted to permit rotation thereof, formed at the ends of the elastic members, said bar-shaped members extending in the direction of movement of the magnetic card, a pair of support members for supporting said bar-shaped members by contacting the respective outer peripheries thereof, said support members supporting said movable assembly with respect to said guide members along a rotational axis having a direction parallel to the direction of movement of said magnetic card, and paired positioning members respectively provided on one of said guide members on opposite sides of said holding frame for engaging said pair of elastic members urge said pair of elastic members away from said one guide member to place said elastic members so as to define an initial position of said transducer.

2. A magnetic card reader according to claim 1, wherein said elastic members are made of metal spring plates, said holding frame and said bar members being made of synthetic resin, said elastic members, said bar members and said holding frame being integrated by insert molding.

3. A magnetic card reader according to claim 1 or 2, wherein at least one of said bar members has a step in contact with said support member for restricting the movement of said movable assembly in the direction of movement of said magnetic card.

4. A magnetic card reader according to claim 1, wherein said guide members are constructed of flat plates having an opening at a mounting position faced by said transducer.

5. A magnetic card reader according to claim 4, wherein said flat plates are metal plates.

6. A magnetic card reader according to claim 5, wherein said two support members are cut up from a metal plate forming said guide members.

7. A magnetic card reader according to claim 6, wherein one of said cut up support members has a hole for rotatably accomodating one of said bar members, and the other of said support members has a recess for rotatably supporting the other of said bar members.

8. A magnetic card reader according to claim 7, wherein said guide member has a hole larger than the projected area of said other support member in the vicinity of said second support member.

9. A magnetic card reader according to claim 7 or 8, wherein said bar-shaped member supported by said other support member includes a neck part as a step for restricting the movement of said movable assembly in the direction of movement of said magnetic card.

10. A magnetic card reader according to claim 9, wherein said positioning members act on two points in the vicinity of said transducer sandwiching said transducer.

11. A magnetic card reader according to claim 10, wherein said positioning members have at said two points flat portions extending in the direction crossing the direction of movement of said magnetic card in the plane parallel to said magnetic card.

12. A magnetic card reader according to claim 11, wherein said positioning members are formed by being cut up from a metal plate providing said guide members.

13. A magnetic card reader according to claim 12, wherein an opening for accomodating said transducer is formed at a portion of said guide member, from said portion of said positioning members being cut up.

14. A magnetic card reader according to claim 12, wherein said support members, together with said positioning members, are formed by being cut up from said metal plate forming said guide members.

15. A magnetic card reader according to claim 14, wherein said positioning members have a portion tapered in the same direction as that of said recess formed in said other support member.

16. A magnetic card reader, comprising:
a first and second guide members fixedly arranged parallel to each other and defining therebetween a card path for guiding movement of a magnetic card, said first guide member being provided with an opening;
a flexible plate having first and second end portions and an intermediate portion;
first and second bar members, with shapes adapted to permit rotation thereof, fixed to said first and second end portions of said flexible plate, respectively;
first and second support members fixedly positioned on said first guide member beside said opening of said first guide member along the moving direction of said magnetic card, said first and second support members rotatably supporting said first and second bar members, respectively, so that said intermediate portion of said flexible plate spacedly faces said opening of said first guide member; and
a magnetic head fixed to said intermediate portion of said flexible plate and extending into said card path through said opening of said first guide member, said first and second bar members cooperating with said first and second end portions of said flexible plate and said first and second support members to bias said magnetic head for movement in a direction toward said card while permitting rotation along an axis formed by said first and second end portions of said flexible plate.

17. A magnetic card reader, comprising:
a card guide having upper and lower plates forming a passage for movement of a magnetic card therebetween, said upper plate having an opening to expose a reading surface of said magnetic card;
a magnetic head;
a holding frame for fixedly holding said magnetic head;
a pair of elastic members respectively extending from opposite sides of said holding frame outwardly along a direction of movement of said magnetic card, said elastic members having free ends not attached to said holding frame;

a pair of bar members with shapes adapted to permit rotation thereof, respectively fixed to said free ends of said pair of elastic members;

a pair of support members fixed on said upper plate of said card guide respectively on opposite sides of said opening along the direction of movement of said magnetic card, said pair of support member supporting said pair of bar members rotatably and slidably along the axis thereof such that said magnetic head is projected downwardly through said opening of said upper plate; and a pair of positioning members provided on said upper plate of said card guide, said pair of positioning members respectively abutting against said pair of elastic members in the vicinity of the opposite sides of said holding frame to urge said pair of elastic members away from said upper plate to define an initial position of said magnetic head and to increase elastic force of said pair of elastic members against said magnetic card.

18. A magnetic card reader according to claim 17, wherein said pair of elastic members are formed as a unit by a spring plate of metal.

19. A magnetic card reader according to claim 17, wherein the height of said pair of positioning members from the surface of said upper plate of said card guide is larger than that of the axis of said pair of bar members supported by said pair of support members.

* * * * *